United States Patent [19]

Melville

[11] 4,134,595
[45] Jan. 16, 1979

[54] ANNULAR SEALS

[75] Inventor: John G. E. Melville, Shoreham-by-Sea, England

[73] Assignee: Worcester Controls (U.K.) Limited, Sussex, England

[21] Appl. No.: 821,061

[22] Filed: Aug. 1, 1977

[30] Foreign Application Priority Data

Aug. 4, 1976 [GB] United Kingdom ............... 32541/76

[51] Int. Cl.² .................. F16K 25/00; F16K 5/06; F16J 15/32
[52] U.S. Cl. ................................ 277/9; 277/12; 277/31; 277/207 R; 251/172; 251/315; 277/1
[58] Field of Search ............... 251/172, 174, 315, 317; 277/1, 9, 12, 30, 207 R, 31, 207 A, 168–170, 237

[56] References Cited

U.S. PATENT DOCUMENTS

| 2,297,161 | 9/1942 | Newton | 251/315 |
| 3,002,525 | 10/1961 | Grove | 251/174 X |
| 3,006,599 | 10/1961 | Eckert | 251/174 X |
| 3,269,693 | 8/1966 | Gulick | 251/315 X |
| 3,331,581 | 7/1967 | O'Connor | 251/174 X |
| 3,497,176 | 2/1970 | Priese | 251/172 |
| 3,556,471 | 1/1971 | Paul | 251/172 |
| 3,587,155 | 6/1971 | Packard | 277/216 X |

FOREIGN PATENT DOCUMENTS

| 2355198 | 7/1975 | Fed. Rep. of Germany | 277/207 A |
| 1004971 | 9/1965 | United Kingdom | 277/207 R |

Primary Examiner—Robert S. Ward, Jr.
Attorney, Agent, or Firm—Pollock, Vande Sande & Priddy

[57] ABSTRACT

A method of sealing an annular gap and a sealing arrangement suitable for plug valves, shafts and pistons. An annular sealing member is toroidally rotated through a substantial angle prior to or during insertion in the gap to be sealed, and is arranged so as to be free to react toroidally against the sealing surfaces bounding the gap for positive sealing engagement therewith. In this way the sealing member forms a resilient seal for the gap without being subject to significant radial stresses. An important application of the invention is to seat seals for ball plug valves.

14 Claims, 14 Drawing Figures

ANNULAR SEALS

BACKGROUND OF THE INVENTION

This invention relates to a method of stressing an annular seal member, a method of sealing an annular gap, and a sealing arrangement particularly, although not exclusively, applicable to plug valves.

Plug valves are commonly provided with annular seat members surrounding respective ports in the valve body and engaged between the inner surface of the body and the surface of the plug. The seat members serve to provide seals between the plug and body, and, in the case of floating plug valves, to provide bearing surfaces for the plug.

In an attempt to maintain positive sealing engagement between the seat members and the surfaces of the plug and body when under low service pressure, the valve can be arranged so that each seat member is resiliently stressed to react against those surfaces. In this way, changes in relative dimensions resulting from temperature fluctuations, variations within manufacturing tolerances and movement of the plug under varying service load conditions can be accommodated by resilient deformation of the seat members.

A difficulty arises, however, in the use of material for the seat members which has poor elastic properties and a tendency to deform plastically, for example, fluorocarbon plastics material. Fluorocarbon plastics material, especially PTFE, is particularly valuable as a seat member material because it retains most of its useful properties over a wide range of temperatures, is unaffected by nearly all known chemical substances and has excellent anti-friction properties. One property of the material, however, is that when subject to stress over a period of time the material tends to deform plastically to reduce the stress, the effect being particularly pronounced at elevated temperatures. Moreover, the instantaneous elastic range of PTFE is rather limited. That is to say, the percentage deformation to which the material can be subjected so that it will return immediately to its original shape or size upon removal of the deflecting influence is small (compared, for example, with that in the case of rubber).

In a ball plug valve, the loading to which the seat member is subject with the valve closed under service pressure can be many orders of magnitude greater than the assembly stress (that is to say, the resilient stress "built-in" to maintain positive sealing engagement, as indicated above, under low service pressure). Such loading can result in severe local plastic deformation of a PTFE seat member, loss of the assembly stress and consequential leakage at low pressure. Similar plastic deformation can occur as a result of large temperature fluctuations. The ratio of the thermal expansion co-efficients of steel (of which the body and plug are commonly made) and PTFE is of the order of 1:10, so that at elevated temperatures, the seat member expands relatively to the other components. As a result, the seat member can be subject to substantial compressive hoop stress from the bore of the seat member recess in the valve body, and radial compressive stress owing to confinement between the plug and body surfaces. At low temperatures the seat member contracts so as to grip tightly around the ball plug, or jam between the plug surface and the shoulder of the seat recess. This results in deformation of the seat member, increased operating torque and increased wear.

Similar problems arise in the case of shaft and piston seals. In a shaft or piston sealing arrangement, it is necessary for positive sealing to maintain a minimum loading of the annular seal member against the surface of the shaft or piston on the inner side of the ring and the surface of the shaft housing or cylinder chamber on the outer side of the ring. On the other hand the loading should not be too great as this increases friction and wear.

A common sealing arrangement comprises a sealing ring, for example an 'O-ring', compressed in the annular gap between the surface of the shaft or piston and the surface of the shaft housing or piston chamber. The ring is thus subject to radial compression between those surfaces. A difficulty with this arrangement, however, is that the radial stress in the sealing ring varies rapidly with variation of the thickness of the annular gap. Thus slight eccentricity of the shaft, or slight variation in the diameter of the piston chamber, can cause substantial variation in the loading on the sealing ring resulting in either leakage or excessive wear of the ring. Moreover, the life of the sealing ring in such an arrangement is relatively short since even in ideal conditions, only slight wear of the ring produces a significant reduction in the sealing load exerted. This can only be compensated by increasing the initial compression of the ring or making the ring of softer material and in both cases this serves to accelerate wear.

The above problems are particularly pronounced in the case of sealing rings of fluorocarbon plastics material, for example, PTFE.

SUMMARY OF THE INVENTION

It is an object of the present invention to provide a method of sealing an annular gap, and a sealing arrangement for an annular gap, in which the above described disadvantages of known methods and arrangements are eliminated or substantially reduced.

From one aspect the present invention provides a method of sealing an annular gap separating first and second generally circular surface regions by locating an annular member therein which is stressed to exert a sealing load on said surface regions, the said annular member being stressed by toroidally rotating the member through a substantial angle and being positioned in said gap so as to be free to react toroidally against said first and second surface regions whereby the said sealing load is produced substantially entirely by the toroidal reaction of said annular member.

From another aspect the invention provides a sealing arrangement comprising first and second generally circular surface regions separated by an annular gap, and an annular member disposed in said gap and stressed to exert a sealing load on said first and second surface regions to form a seal therebetween, the annular member being compressively and extensibly hoop stressed in respective first and second portions of the radial section thereof and arranged to be free to react toroidally against said first and second surface regions under the action of the hoop stresses whereby said sealing load is produced substantially entirely by the toroidal reaction of said annular member.

One specific embodiment of the invention provides a ball plug valve comprising a sealing arrangement as described in the above paragraph in which the said first surface region is an inner annular surface region of the valve body, the said second surface region is a surface region of the ball plug and the said annular member is a seat member for the ball plug.

Another specific embodiment of the invention provides a shaft or piston seal assembly comprising a sealing arrangement as described above in which one of the said first and second generally circular surface regions is an inner cylindrical surface region of a shaft housing or piston chamber and the other of the said surface regions is a cylindrical surface region of a shaft or piston. The first and second surface regions are spaced from one another along the axis of the shaft or piston so that the annular member can react toroidally against the surface regions to form a seal therebetween.

DESCRIPTION OF THE ILLUSTRATED EMBODIMENTS

In order that the invention may be clearly understood and readily carried into effect, embodiments thereof will now be described with reference to the accompanying drawings wherein:-

Figure 1:
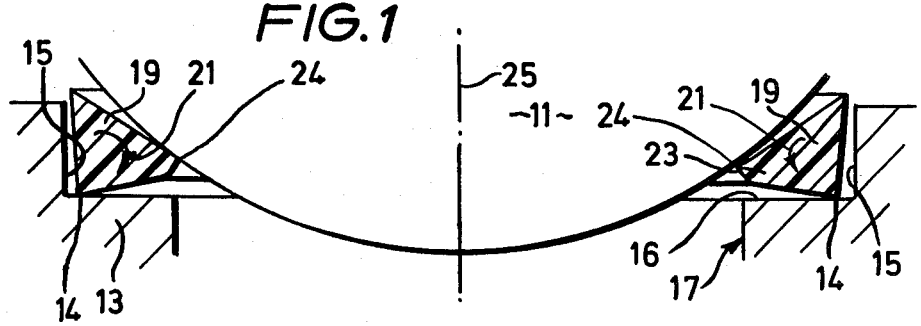
FIG. 1 is a cross-sectional view of a seating arrangement in a rotary ball plug valve.
Figure 8:
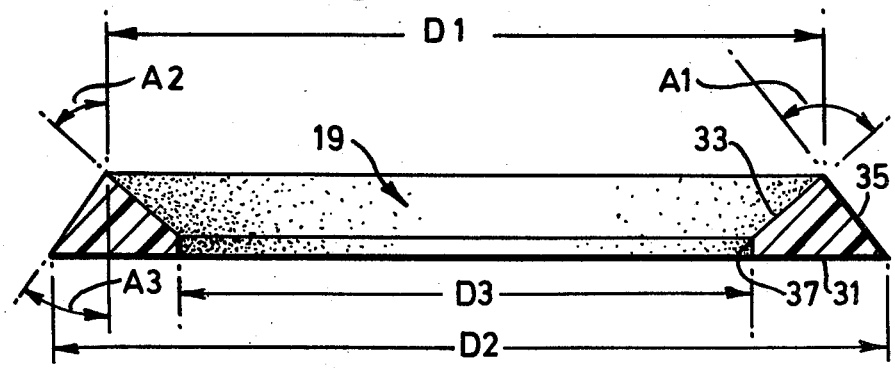
Figure 3A:
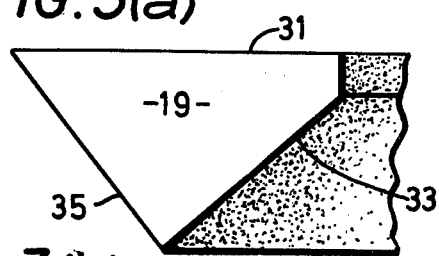
Figure 3B:
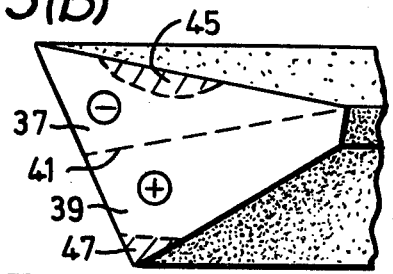
Figure 3C:
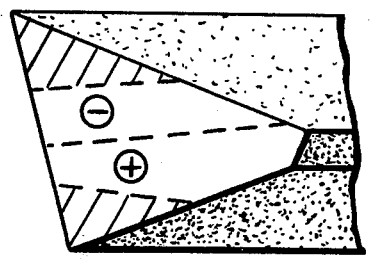
Figure 3D:
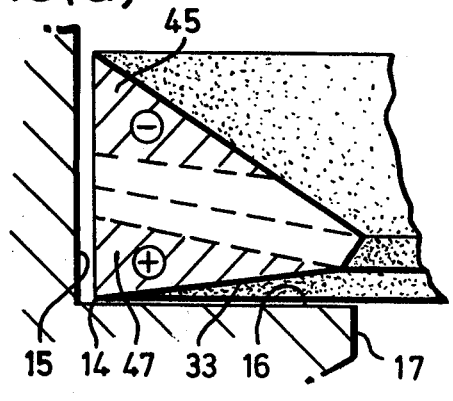
Figure 3E:
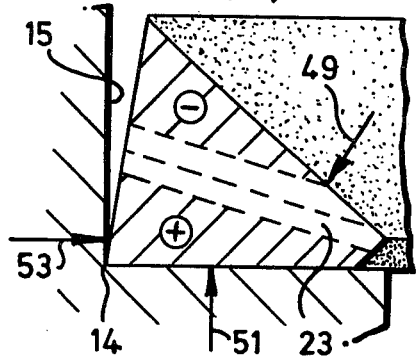
Figure 3F:
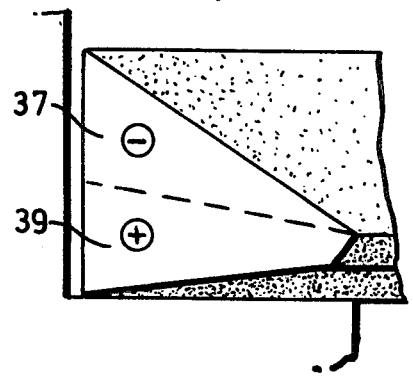
Figure 3G:
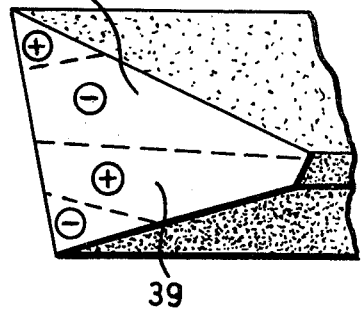
Figure 4:
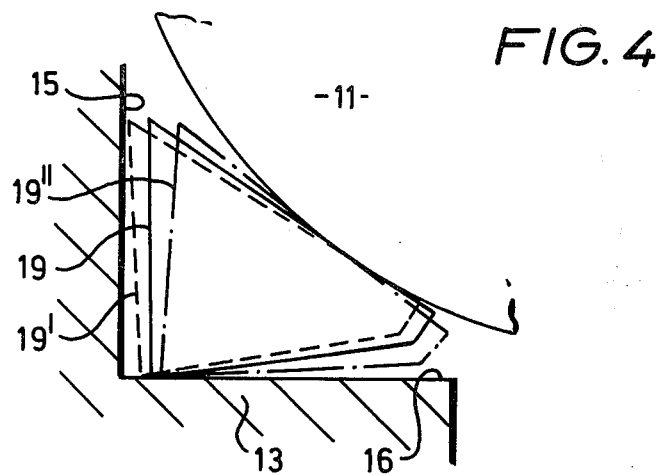
Figure 6:
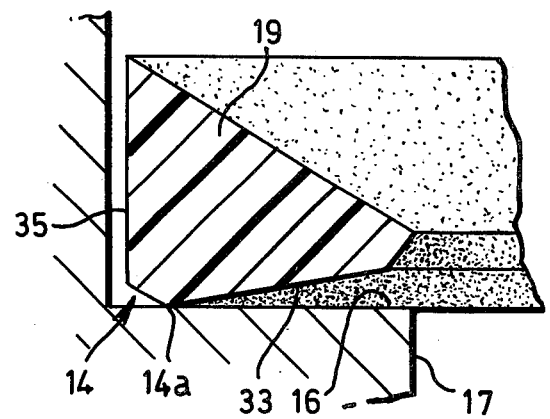
Figure 7:
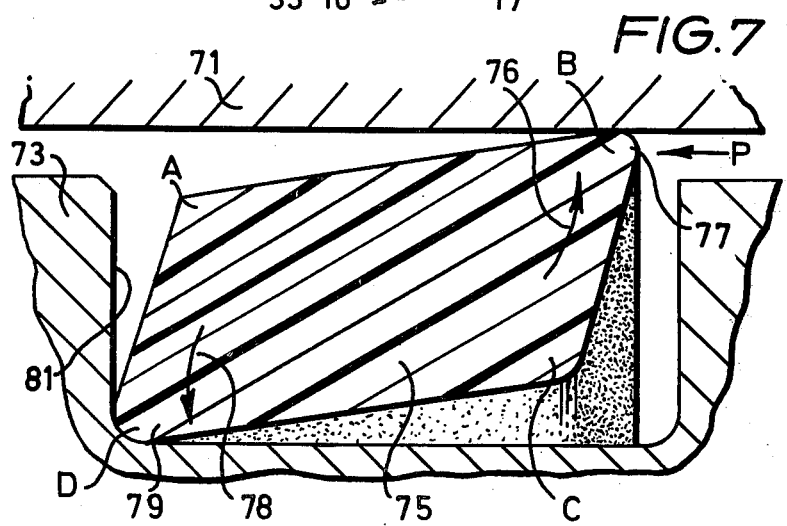
Figure 5:
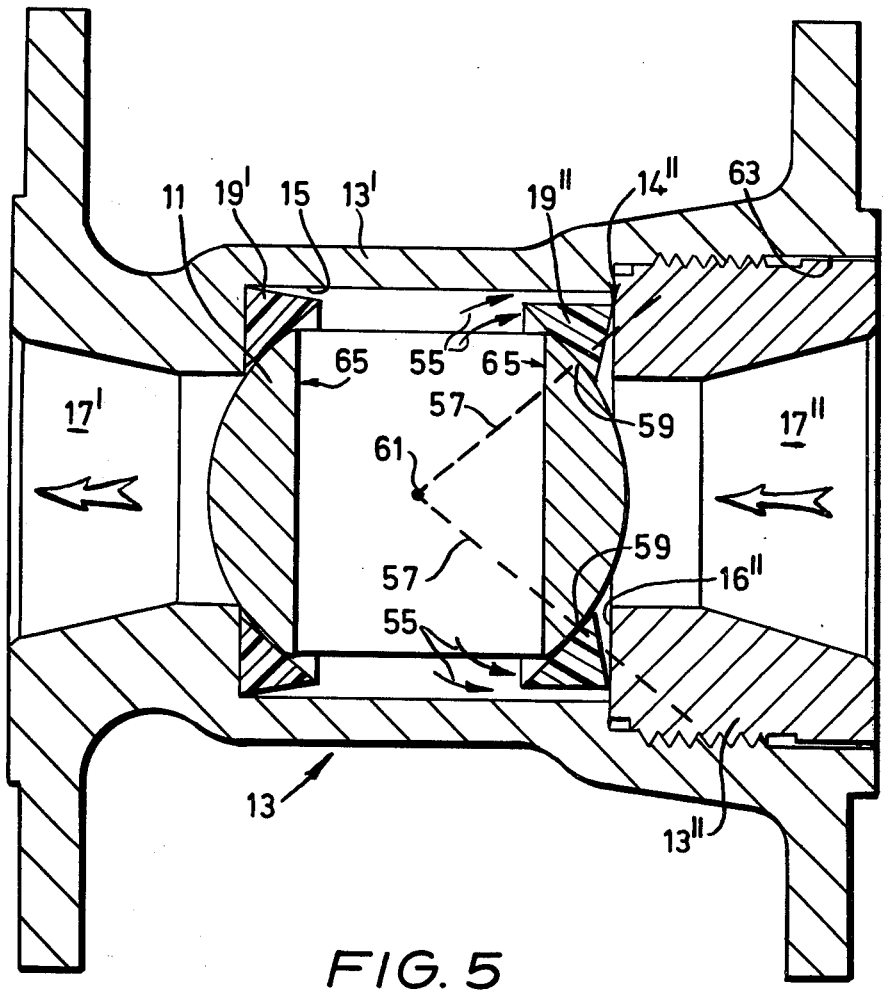

FIGS. 3(a) through 3(g) show cross-sectional views of a portion of a seat member for a ball plug valve in different stages of toroidal rotation;

FIG. 4 is a cross-sectional view of a portion of a seat member and adjacent components in the rotary ball plug valve of FIG. 1;

FIG. 5 is a cross-sectional view of a ball plug valve in accordance with the invention;

FIG. 6 is a view similar to that of FIG. 4 illustrating a modified form of sealing member;

FIG. 7 is a cross-sectional view of part of a shaft or piston sealing assembly in accordance with the invention; and FIG. 8 is a cross-sectional view of the seat member of a specific example of ball plug valve in accordance with the invention.

FIG. 1 is a cross-sectional view of a seating arrangement in a ball plug valve, and shows the ball plug 11, valve body 13, an annular seat recess 15 formed in the body 13 with shoulder 16 surrounding a port 17 of the valve, and an annular seat member 19 retained in the seat recess 15. The ball plug 11 and body 13 are of steel, and the seat member 19 is of PTFE.

The seat member 19 is urged into engagement with the ball plug 11 and shoulder 16 by stresses within the seat member itself. More particularly, on assembly of the valve, the seat member 19 is toroidally rotated in the direction of the arrows 21 into the position shown. The stresses thus set up within the seat member tend to toroidally rotate the member in the reverse direction so as to urge the radially inner annular region 23 of the member into sealing engagement with a corresponding substantially circular region 24 of the surface of the ball plug 11, and to urge the "heel" 14 of the member into sealing engagement with the shoulder 16. It will be noted that the heel 14 contacts the annular surface region formed by the shoulder 16 along a substantially circular line centered on the axis 25. The axis 25 is common to the annular seat member 19, the bore of the port 17 and the annular recess 15, and passes through the center of the ball plug 11.

Figure 2:
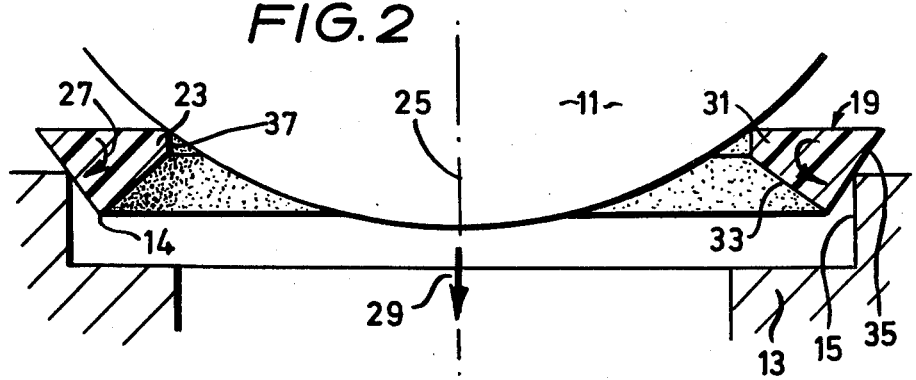
FIG. 2 is a cross-sectional view of a portion of the ball valve of FIG. 1 during assembly thereof.

FIG. 2 illustrates the method of assembly of the valve, and in particular shows the shape of the seat member 19 in its initial, unstressed condition before such assembly.

It will be noted that initially the seat member is of generally triangular section, being formed with a substantially plane annular surface 31, an inner conical surface 33, and an outer conical surface 35. The corner between the surfaces 31 and 33 is truncated to provide a short inner bore 37.

To assemble the valve, the seat member 19 is positioned in the recess 15 or (as shown in the drawing) at the mouth of that recess, with the heel 14 formed by the corner between the conical surfaces 33 and 35 facing inwardly towards the recess. The ball plug 11 is next centered on the axis 25 and forced into the recess in the direction of arrow 29 to the assembled position as shown in FIG. 1, thereby toroidally rotating the seat member 19 in the direction of arrows 27. It will be noted that the angle through which the seat is toroidally rotated from the initial, relaxed configuration shown in FIG. 2 to the configuration in an assembled valve, as shown in FIG. 1, is subtantial. The angle of rotation is such that the initially conical surface 35 becomes generally cylindrical, while the apex angle of the cylindrical surface 33 is substantially increased from the order of 90 degrees to an obtuse angle approaching (although not reaching) 180 degrees. Such "massive" toroidal rotation of the seat member hoop strains the PTFE material beyond its instantaneous elastic limit over a substantial proportion of the radial section of the member, as witnessed by the fact that upon removal of such a seat member from a previously assembled valve, the member initially relaxes to a configuration intermediate the initial and assembled configurations.

The stresses believed to be developed in the seat member during "massive" toroidal rotation are illustrated diagrammatically in FIG. 3. FIG. 3 (a) represents the initial, unstressed configuration of the seat member, FIGS. 3 (b) and (c) represent successive intermediate configurations on toroidal rotation of the seat member during assembly of the valve, and FIG. 3 (d) represents the configuration, corresponding to that shown in FIG. 1, of the seat member in the assembled valve under zero service load conditions. As the seat member is toroidally rotated, a portion of the section of the seat member is reduced in circumference, and another portion of the section is increased in circumference. Those two portions of the section are indicated in FIG. 3 at 37 and 39 respectively, the portions being separated by a neutral region, generally in the vicinity of the broken line 41, for which little change in circumference occurs. Accordingly, on toroidal rotation, the seat member is hoop-stressed, portion 37 of the section being compressively hoop-stressed and the portion 39 of the section being extensionally hoop-stressed (compressive and extensional hoop stresses are indicated in the drawing by the "—" and "+" signs respectively). Shear and bending stresses may also be induced in the member, but these will be relatively small compared with the hoop stresses.

The regions of the seat member subject to the greatest hoop strain (that is to say, circumferential elongation or compression) are those furthest removed from the neutral region 41. It is in those regions first that the instantaneous elastic limit of the PTFE material is exceeded during toroidal rotation of the member. As the toroidal rotation of the member is continued, the regions in which the elastic limit is exceeded, indicated in the drawings by the shaded areas 45 and 47 of the section, spread progressively inwardly towards the neutral region 41. In the assembled seating arrangement, a substantial proportion of the area of the section of the seat member has been subject to strain beyond the instantaneous elastic limit of the material. Thus, the hoop stresses remaining in the regions 45 and 47 correspond generally to the maximum elastic stress sustainable by the material, the hoop stresses being substantially uniform over those regions.

The compressive and extensional hoop stresses set up in the regions indicated at 37 and 39 respectively of the seat member in the assembled valve causes the seat member to react toroidally against the surface of the plug 11 and the surface 16 of the housing to form a seal therebetween as mentioned previously. It will be noted that the sealing load (when the valve is under zero service load conditions) is thus produced entirely by the toroidal reaction of the seat member. The seat member is free of any contact with the inside surface of the housing 13 or surface of the plug 11 other than those at the inner annular region 23 and heel 14. Moreover, substantially the whole of the bulk of the material of the seat member contributes to such toroidal reaction, and, being stressed to substantially the maximum sustainable by the PTFE material, contributes to the toroidal reaction to its maximum possible capability.

A particular feature of the arrangement described is that a relatively large percentage variation in the thickness of the annular gap between the surface 16 of the valve body and the surface of the ball plug 11 results in only a relatively small percentage hoop deformation of the seat member. As a consequence, the seat member maintains its toroidal reaction against the surfaces of the valve body and plug despite substantial variation in the relative positions of those surfaces. This feature is of particular relevance to certain performance characteristics of the valve, as discussed in greater detail below.

In FIG. 3, the configuration of the seat member when the valve is under high service load is indicated at FIG. 3 (e). The force exerted on the seat member by the plug 11 is indicated by the vector 49, and this is sufficient to toroidally rotate the seat member until the surface 33 lies flat against the shoulder 16 of the seat recess, and the heel 14 engages the bore 15 of the recess. The force 49 is substantially balanced by the reaction forces 51 and 53 developed in those regions of contact.

It will be appreciated that upon initial deflection into the configuration indicated at FIG. 3 (e), further plastic deformation occurs in the regions 45 and 47 of the seat member so that, on return to the "assembled" configuration (that is to say, the configuration when the valve is under zero service load) the stresses in the material are reduced slightly from the maximum sustainable by the material. This situation is indicated at FIG. 3 (f). On subsequent deflections between the FIG. 3 (e) and FIG. 3 (f) configurations, deformation of the seat member is substantially elastic.

On removal of the seat member from a previously assembled valve, the member reverts to a configuration intermediate the initial FIG. 3 (a) and assembled FIG. 3 (d) configurations, the intermediate configuration being indicated at FIG. 3 (g). It will be noted that, in the configuration of FIG. 3 (g), the member is subject to no externally applied forces or couples so that all stresses in the material must be balanced. It is believed that in this condition the extremities of the regions 37 and 39 are respectively extensionally and compressively hoop stressed, while the inner parts of the portions 37 and 39 retain their compressive and extensional stresses. On re-assembling a valve, the stress pattern reverts to that indicated at FIG. 3 (d) or FIG. 3 (f).

It will be appreciated that the seat member illustrated could be toroidally rotated into the "prestressed" condition shown at FIG. 3 (g) in ways other than by being assembled in a plug valve. For example, a suitable tool could be used to rotate the member substantially into the position shown at FIG. 3 (e) so that a substantial portion of the material of the member is hoop-strained beyond its instantaneous elastic limit, as described above, and the member then allowed to relax to substantially the "prestressed" condition shown at FIG. 3 (g) ready for assembly in a valve at some later data. Moreover, a seat member initially fabricated with the shape shown at FIG. 3 (g), that is to say, a member with that shape but without the "locked-in" hoop stresses indicated, does not when assembled in a ball valve have the performance described herein in respect of the member which has been subjected to substantial toroidal rotation.

As mentioned previously, it is a particular and advantageous feature of the valve seating arrangement described above that seat member 19 retains its toroidal reaction properties over a significant range of variations in the dimensions of the annular gap sealed by the seat member. Accordingly, the sealing load between the seat and the plug and housing surfaces is little affected by dimensional variations within normal ranges of manufacturing tolerance; such variations can be accommodated readily by toroidal deflection of the seat member without significant change in the reaction exerted by the seat member.

A further advantageous feature of the arrangement described is an ability to tolerate substantial variation in temperature without significant degradation in performance of the valve. As can be seen from FIGS. 1 and 3, in the assembled valve under zero service load conditions, a substantial clearance is provided between the generally cylindrical surface 35 of the seat member and the bore 15 of the seat recess. This clearance provides a space into which the seat member can expand (relatively to the body 13) at elevated temperatures without being subject to constriction and consequential deformation by the recess or confinement between the surfaces of the plug and valve body.

FIG. 4 provides a diagrammatic illustration of changes in configuration of the seat member under wide temperature fluctuations. At mid-range temperatures, the outline of the seat section 19 is as indicated in full lines and corresponds to that shown in FIG. 1. As the temperature is increased, the diameter of the seat member increases relatively to that of the recess 15 so that the section moves to the left (as seen in the drawing) to the position 19'. It will be noted that contact of the seat member with the surface of the plug 11 is maintained by toroidal rotation of the member under the action of the hoop stresses discussed above.

When the temperature is lowered, the diameter of the seat member is reduced relatively to that of the recess 15 and plug 11, so that the seat member section moves to the right (as seen in the drawing) to the position indicated at 19". It will be noted in this case also that such relative movement of the seat member section can readily be accommodated by toroidal rotation of the member, there being little tendency, therefore, for the member to clamp around the plug or become wedged between the plug surface and recess shoulder 16.

It is a further significant feature of the arrangement described that the valve is able to withstand substantial service loading without leakage subsequently occurring at the seat member which was subject to that loading. Referring again to FIG. 3, and in particular to FIG. 3(e), it will be noted that the forces 49, 51 and 53 exerted on the seat (and which are sufficient, locally, to compressively stress the seat material substantially beyond the point at which plastic deformation occurs) are concentrated in the lower part (as seen in the drawings) of the seat section, principally in the annular region 23 and the heel 14. In these regions, significant plastic deformation and permanent modification of the stress pattern can be caused by the high load forces. However, the bulk of the seat material is not affected by these forces, so that over a large proportion of the seat section, the hoop stresses providing the toroidal reaction described previously are not significantly altered. Accordingly, upon removal of the service load, sufficient toroidal resilience is retained by the seat member to maintain sealing contact with the surface of the plug 11 and shoulder 16 and to accommodate any dimensional changes in the seat which may have been caused by deformation under the action of the service load.

FIG. 5 is a cross-sectional view of a complete ball plug valve in accordance with the invention. The section shown is that in the plane orthogonal to the axis of rotation 61 of the ball plug 11. The valve body 13 comprises a main body portion 13' in which is formed one of the valve ports 17', and an annular body portion 13" threadedly engaged in an axial opening 63 in the main body portion to provide the other of the valve ports 17".

The valve is illustrated as under service load conditions, the valve being closed of course and subject to service pressure applied at port 17". The resulting pressure on the plug 11 forces the plug in the downstream direction (to the left as seen in the drawing) thereby rotating the downstream seat member 19' into abutment with the downstream shoulder 16' as described above with reference to FIG. 3(e).

To assemble the valve illustrated, the seat member 19' is positioned in the opening 63 and then forced axially into the bore 15 of the valve body portion 13', either by means of the plug 11 or with a suitable tool, substantially as described above with reference to FIG. 2. A different procedure is used for seat member 19": the member is first toroidally rotated in the required direction by means of a suitable jigging tool, and then inserted while thus held in the stressed condition.

Finally, the annular portion 13" is screwed into the opening 63 to provide, at its inner end, shoulder 16" for engagement with the heel of member 19".

A significant feature of the arrangement described is an ability to provide cavity pressure relief. When a plug valve is closed trapping liquid in the cavity of the plug, large pressures can be developed by the trapped liquid if there is a significant change in temperature. The geometry of the arrangement described above is such that fluid pressure exerted on the seat member in the reverse direction, that is to say, in the direction towards the associated valve port 17, is such as to tend to toroidally rotate the seat member away from the surface of the plug 11.

In FIG. 5, the arrows 55 indicate fluid pressure applied by liquid trapped in the cavity 65 of the plug 11. It will be noted that for pressure applied from this direction to act against the toroidal reaction in the seat member, the circle of contact of the seat member with the surface 16" (at the heel 14") must lie outside the cone generated by an extrapolation of the radii 57 of the ball plug which intersect the circular region 59" at which the seat member normally contacts the surface of plug 11.

Under service load conditions, cavity pressure relief occurs at the upstream seat member 19" since the loading on that member is substantially less than that on the downstream seat member 19'.

A further advantageous feature of the arrangement described is that the valve can be designed to have a relatively low sealing load between the seat member and ball plug 11, this being possible because no "reserve" of loading need to be provided to allow for dimensional variations resulting from finite manufacturing tolerances, temperature fluctuations or deformation of the seat member under high service load conditions. As noted above, such dimensional variations can readily be accommodated by toroidal rotation of the seat member without significant change in the toroidal reaction exerted by the seat member. It will be appreciated by those skiled in the art that a reduction in the sealing load can provide a substantial advantage in the case of large plug valves in which the "break-away torque" can be substantial.

A further advantage of the arrangement described is that the seat member can readily be fabricated from PTFE by well known moulding or turning techniques.

FIG. 6 illustrates the radial section through a modified form of seat member 19 and associated seat recess. In the form illustrated in FIG. 6, the "heel" of the seat member is chamfered so that the corner 14a of the member which contacts the shoulder 16 is of relatively oblique angle and lies on a circle of reduced radius compared with the arrangements illustrated in FIGS. 1 to 5. This has the effect of reducing the effective couple-arm through which the torsional loading of the seat member is transmitted to the region of engagement of the seat member and ball plug, thereby increasing the apparent "stiffness" of the seat. The arrangement has the added advantage that the corner 14a, which is intended to form a sealing contact with the shoulder 16, is spaced from the part of the heel 14 which is subject to high stresses under service load conditions and therefore less liable to be deformed thereby, and is less vulnerable to possible damage by mishandling and the like before assembly of the seat in a valve.

It will be appreciated that the method of stressing an annular seal member, the method of sealing an annular gap and the sealing arrangement per se, as described above in the particular context of a seat member in a rotary ball plug valve, can be applied advantageously in other contexts, for example, shaft seals and the like.

FIG. 7 illustrates a shaft or piston sealing arrangement in accordance with the invention, and particularly a radial section through the annular sealing member 75 and adjacent portions of the shaft housing or piston chamber 71 and shaft or piston 73.

On assembly of the arrangement illustrated, the sealing member was toroidally rotated through a substantial angle in the clockwise direction (as seen in the drawing). The member therefore reacts toriodally in the reverse direction, as indicated by the arrows 76 and 78, to provide sealing engagement of the corners 77 and 79 with the members 71 and 73 respectively.

The arrangement illustrated is particularly intended to provide sealing against fluid pressure acting from the right (as seen in the drawing) as indicated by the arrow P. An annular shoulder 81 on the member 73 forms an abutment for the sealing member to prevent axial displacement thereof to the left under the action of the applied pressure.

It is to be noted that in the arrangement illustrated the points of engagement 77, 79 of the sealing member with the members 71, 73 are axially spaced (the axial direction being the horizontal direction as seen in the drawing) so that the sealing load on those members is maintained substantially entirely by toroidal reaction of the sealing member without that member being subject to radial stress. EXAMPLE Two annular seat members were produced by turning from an extruded tube of PTFE material, specification BS 4271, Grade A1. The seats were cut to the shape shown in FIG. 8, the dimensions indicated in that Figure being as follows:

Diameter D1; 4.225 inches
Diameter D2; 4.900 inches
Diameter D3; 3.400 inches
Angle A1; 82.5 degrees
Angle A2; 47.5 degrees
Angle A3; 35.0 degrees The seats were positioned in respective annular recesses (similar to the one shown at 15 in FIG. 1) in a housing for a rotary ball plug valve, the recesses having a bore of 4.625 inches. The valve was assembled with a ball plug (11 in FIG. 1) of diameter 5.363 inches and with the separation of the recess shoulders (16 in FIG. 1) of the respective recesses being 4.399 inches.

Valves constructed as above were subject to a variety of performance tests and found to exhibit substantially improved performance characteristics compared with present commercially available plug valves, particularly with regard to high pressure tolerance, temperature variation tolerance and ability to permit cavity pressure relief, and were found to have a significantly reduced break-away torque.

I claim:

1. A sealing arrangement comprising:
   (a) first and second generally circular surface regions;
   (b) an annular gap defined by said surface regions; and
   (c) an annular member disposed in said annular gap and stressed to exert a sealing load on said surface regions to form a seal therebetween, said annular member in said gap having a cross-sectional configuration which is different from the initial unstressed configuration of said member provided at the time of fabrication of said member and prior to its insertion into said gap which different cross-sectional configuration is compressively and extensibly hoop stressed in respective first and second portions of the radial section thereof by toroidal rotation of the member from said initial unstressed configuration through a substantial angle sufficient to hoop strain the material of said member beyond the instantaneous elastic limit thereof over a substantial proportion of the radial section of said member, said toroidally rotated member being free to react toroidally against said first and second surface regions under the action of said hoop stresses whereby said sealing load is produced substantially entirely by the toroidal reaction of said annular member.

2. A shaft or piston seal assembly comprising a sealing arrangement as claimed in claim 1 wherein one of said first and second generally circular surface regions is an inner cylindrical surface region of a shaft housing or piston chamber, the other of said first and second generally circular surface regions is a cylindrical surface region of a shaft or piston, and said first surface region is axially spaced from said second surface region whereby said annular member can react toroidally against said first and second surface regions under the action of said hoop stresses.

3. An assembly as claimed in claim 2 wherein one of said first and second surfaces is formed with a radially extending shoulder for abutment by said annular member for axial location thereof.

4. A sealing member adapted to be placed in an annular gap that is defined by first and second surface regions to form a seal between said surface regions, said sealing member having an annular configuration which is different from the initial unstressed configuration of said member provided at the time of its initial fabrication and which is compressively and extensibly hoop stressed in respective first and second portions of the radial section thereof as a result of said member having been toroidally twisted from its said initial unstressed configuration through a substantial angle sufficient to hoop strain the material of said member beyond the instantaneous elastic limit thereof over a substantial portion of the radial section of said toroidally rotated member, whereby the toroidally twisted annular sealing member can be positioned in said annular gap in its stressed configuration and arranged to react toroidally against said first and second surface regions under the action of the said hoop stresses to form a seal therebetween.

5. A sealing member as claimed in claim 5 wherein the material of said annular member is fluorocarbon plastics material.

6. A sealing arrangement comprising a first member defining a substantially circular aperture to be sealed and having a first surface surrounding and extending away from said aperture, a second member arranged to be positioned to cover said aperture and when so positioned having a second surface positioned in proximity to said first surface and defining therewith an annular gap, and a sealing member located between said first and second surfaces and held therebetween to seal the annular gap, said sealing member being toroidally stressed in the sense corresponding to a rolling displacement on said first member towards said aperture as a result of said member having been toroidally twisted through a substantial angle prior to or at the time of installation of said member between said first and second surfaces.

7. A sealing arrangement as claimed in claim 6 wherein the material of said annular member is fluorocarbon plastics material and the said substantial angle is sufficient to strain the material of said member beyond the instantaneous elastic limit thereof over a substantial proportion of the radial section thereof.

8. A ball plug valve having a valve body, a ball plug located within said body, and an annular seat member located in an annular space between said valve body and said ball plug, said seat member being toroidally stressed as a result of said member having been rotated through a substantial angle sufficient to hoop strain the material of said member beyond the instantaneous elastic limit thereof over a substantial portion of the radial section of said member, said toroidally rotated annular seat member being held in said toroidally stressed condition in said space between an inner surface region within said valve body and a surface region of said ball plug, the surfaces of said seat member presented towards the surface regions of the valve body and the ball plug which they contact being so dimensioned and oriented that increasing pressure of said ball plug surface region upon the seat member tends to rotate the seat member toroidally in the sense which turns the ball plug contacting surface of the seat member towards the axis of the seat member.

9. A ball plug valve having a valve body, a ball plug located within said body, and an annular seat member located in an annular space between an inner surface region of said valve body and a surface region of said ball plug, said seat member having an annular face presented towards said ball plug and being toroidally stressed to sustain said annular face in a conical configuration the cone angle of which tends to decrease with increasing pressure of said ball plug thereon, said seat member being toroidally stressed by toroidal rotation of said annular member from an unstressed condition through a substantial angle.

10. A ball plug valve as claimed in claim 9 in which said annular face of the seat member is substantially planar in the unstressed condition of said member and is stressed by said toroidal rotation of said member into a conical configuration having a cone angle of less than 140° when assembled in said valve.

11. A ball plug valve as claimed in claim 10 in which the seat member is located in a recess in the valve body, said recess having a radial bearing surface and an axial wall surrounding the said radial bearing surface, and wherein the seat member is of generally triangular cross-section with said planar annular face constituting the base of said triangular cross-section, wherein the larger diameter of said planar annular face is greater than the diameter of said recess wall, wherein the diameter at the apex of the seat member cross-section is less than the diameter of said recess wall, the seat member having been installed within said recess by toroidally rotating it to bring the apex of the base section into contact with the radial bearing surface of the recess, to bring one of the faces adjoining said apex into proximity with the recess wall, to bring the other face adjoining said apex into proximity with the bearing surface of the recess, and to bring the annular face constituting the base facing inwards towards the surface of the ball plug.

12. A ball plug valve as claimed in claim 11 wherein the apex angle of the cross-section of the seat member is less than the angle between the bearing surface and the wall of said recess to provide some freedom of toroidal rotational movement of said seat member within said recess.

13. A ball plug valve having a valve body, a ball plug located within said body, and an annular seat member located in an annular space between an inner surface region of said valve body and a surface region of said ball plug, said annular seat member being of generally triangular cross-section and having a first face presented towards a radial annular surface region of said valve body, a second face presented towards an axial annular surface region of said valve body, and a third face presented towards said surface region of said ball plug, said annular seat member being toroidally stressed by said member having been toroidally rotated from an unstressed condition through a substantial angle, said annular seat member being held in its toroidally stressed condition by pressure between said ball plug acting upon said third face and said radial annular surface of said valve body acting upon at least the radially outer edge of said first face, the circle of engagement of said third face with the surface of said ball plug being smaller than the circle of engagement of said outer edge with said radial annular surface so that increasing pressure of said ball plug on said third face tends to rotate said seat member toroidally in the sense to turn said third face inwardly towards the region of said ball plug encircled by said seat member.

14. A ball plug valve comprising a valve body having a valve cavity, a ball plug within said cavity, and an annular seat member providing a seal between an annular surface region on said valve body and a surface region of said ball plug, said annular seat member being toroidally stressed by said member having been toroidally rotated from an unstressed condition through a substantial angle, and said member being held in its toroidally stressed state by engagement between said surface region of said ball plug and said annular surface region on said valve body, the direction of said stress being such as to provide an annular region of compressional hoop stress and an annular region of extensional hoop stress in said seat member, the region of compressional hoop stress being located axially inwardly of the region of extensional stress in relation to the valve cavity.

* * * * *